2,850,406
COATED POLYMERIC TEREPHTHALATE ESTER FILM

Samuel Gold, Brooklyn, N. Y., and Irwin Davis, Plainfield, N. J., assignors to National Starch Products Inc., New York, N. Y., a corporation of Delaware No Drawing. Application May 4, 1955
Serial No. 506,065

2 Claims. (Cl. 117—122)

This invention relates to compositions suitable for coating polyester films, and to polyester films coated therewith.

An object of our invention is to devise compositions which, when coated upon polyester films and dried, will be non-tacky and non-adhesive, but which upon the subsequent application of heat will become strongly tacky and adhesive. A further object of our invention is to devise such coating compositions, which will have a specific adhesion for polyester films, so that the dried coating will not "strip" or be easily removed from the polyester film. Still another object is to devise coating compositions which when dried upon the polyester film will be so devoid of tackiness that the film, when rolled, stacked, or otherwise placed in contact with itself will not "block" or stick to itself, and yet will nevertheless be entirely flexible. Another object is to produce compositions which when coated and dried upon polyester films will, if desired, be so clear and transparent as to be practically invisible.

As is known, transparent, self-supporting films, or tissues, made from various synthetic materials, are widely used in packaging, laminating and other industrial operations. Perhaps the earliest films of this type were the cellulose acetate or cellophane types. When these films were introduced, it was quickly found that their commercial acceptance would be retarded until suitable adhesives were found that would permit the user to stick these films to various surfaces for the production of bags and other containers, as well as for wrapping, labeling, laminating and the like. The adhesives that had been quite satisfactory for paper were in most cases found to be ineffective for cellophane. Eventually special adhesives were developed which had a specific adhesion to cellophane and cellulose acetate tissues.

The next step in the development of the commercial usefulness of cellophane-type tissues was the development of an adhesive which could be coated upon the tissue and dried, resulting in a transparent, non-tacky coating. When heat was applied to any point of the coated tissue, the adhesive was reactivated. This is known as "heat-seal" coating, and in practice meant that the person using the tissue for packaging or other purposes did not need to be concerned with the application of liquid adhesives but rather merely applied dry heat to the parts of the tissue where adhesion was required.

The synthetic tissue with which our invention is concerned is a self-supporting polyester film, as exemplified by the linear polymeric terephthalate ester film sold by E. I. du Pont de Nemours & Co. under the trade name "Mylar." More specifically, our problem was to produce a heat-seal coating for "Mylar"—that is, a coating which would be clear, flexible and non-tacky when dry, and yet revert to a strongly adhesive state when heated. The discovery of such a coating would vastly increase the usefulness and commercial acceptance of "Mylar," yet a completely suitable coating had not heretofore been devised. The reason for the failure to find such a suitable coating was that the standard adhesives which were suitable for other tissues, such as paper or even cellulose acetate or cellophane, did not have a specific adhesion for "Mylar" polyester films.

When a material was finally found which did appear to have a specific adhesion for "Mylar," it had the disadvantage of retaining a certain degree of residual tackiness when coated and dried, with the result that "Mylar" thus coated blocked and stuck to itself at ordinary room temperatures. Although some additives reduced this residual tackiness, they tended to embrittle the resultant coating so as to impair the flexibility and usefulness of the polyester film.

We have now discovered a composition which may be used to coat polyester films, resulting in a dried coating that is clear, flexible, non-tacky and non-blocking, and strongly adherent to the polyester film, and yet reverts to a tacky adhesive state upon the application of heat. As a result, polyester films thus coated may be used in all types of fabrication and packaging operations without the application of extraneous adhesives, merely by the application of heat to those parts where adhesion is required.

Our coating composition is composed of two major components, which we shall hereinafter refer to as components "A" and "B," respectively.

Component "A" is a tacky, film-forming resin which we have found to have specific adhesion to polyester films. Component "A" is selected from the class of tacky film-formers consisting of polyvinyl alkyl ethers, butadiene-acrylonitrile copolymers (both liquid and solid), polyacrylic rubbers, and soft or liquid low molecular weight polyamide resins. By "polyacrylic rubbers" we refer to the copolymers of alkyl acrylates with other monomers, as for example acrylonitrile. By "low molecular weight polyamide resins" we refer to low molecular weight resins derived from the condensation of polymerized unsaturated fatty acids with aliphatic amines. Representative examples of some of these tacky, film-forming component "A" resins follow:

Polyvinyl alkyl ethers include polyvinyl methyl ether, polyvinyl ethyl ether and polyvinyl isobutyl ether. A low molecular weight butadiene acrylonitrile copolymer is sold by the B. F. Goodrich Chemical Company, Cleveland, Ohio, under the trade name "Hycar 1312." This material is a tacky, amber-colored liquid having a Brookfield Viscosity (#4 spindle at 60 R. P. M.) of 100,000 cps. at 30° C. A suitable solid rubbery butadiene-acrylonitrile copolymer is sold by the same company under the trade name "Hycar 1042X17."

A suitable polyacrylic rubber is sold by the American Polymer Company, Peabody, Massachusetts, under the trade name "Polyco 1665–24." This material is a solution of the acrylic polymer in methyl ethyl ketone, and has a solids content of 45%. A solid polyacrylic rubber is sold by the American Monomer Corp., Acrylon Division, Leominster, Massachusetts, under the trade name "Acrylon EA–5." This latter is composed of an acrylic ester and acrylonitrile and has an ASTM brittle point (ASTM method of test D746–44T) of about plus 16° F. to plus 21° F.

Soft polyamide resins particularly suitable for our composition are sold by General Mills Chemical Division, Kankakee, Illinois, under the trade names "Polyamide Resin 100" and "Polyamide Resin 115." These are amber-colored thermoplastic resins of low molecular weight (approximately 3000–6500) and derived from the condensation of polymerized unsaturated fatty acids with aliphatic polyamines. Polyamide Resin 100 is a soft tacky material, and Polyamide Resin 115 is a viscous liquid.

When used alone, we have found that these component

"A" resins give films which are too soft and pressure-sensitive.

Component "B" of our composition is a resin that has been found to impart cohesiveness, strength, and most important, non-blocking properties to the component "A" material. Component "B" is a resin selected from the class consisting of vinyl acetate-chloride copolymers and the copolymers of vinylidene chloride and acrylonitrile. Representative vinyl acetate-chloride copolymers include one containing 91% chloride, 3% acetate and 6% hydroxyl groups calculated as polyvinyl alcohol; another containing 87% chloride and 13% acetate, and a third containing 86% chloride, 13% acetate and 1% interpolymerized dibasic acid. A suitable vinylidene chloride-acrylonitrile copolymer is that sold by the Dow Chemical Company, Midland, Michigan, under the trade name "Saran Resin F-120."

It must be emphasized that we are well aware of the fact that many of the above-listed resins have been known to have adhesive properties and have in fact been adhered to various types of surfaces. Our invention relates to the use of a particular combination of such resins on a particular surface, namely polyester film such as "Mylar." The advent of a new synthetic film poses unique problems of adhesion. Of all of the thousands of resins known to have adhesive properties toward one surface or another, only a very limited number may be found to adhere to a particular film. Polyester film posed particularly difficult problems in this respect, since most of the known resins did not adhere satisfactorily to it. It was necessary to discover a resin, or a resin combination, that would not only have specific adhesion toward polyester films, but that would also adhere satisfactorily to other surfaces, since the coated film is ultimately heat-sealed not only to itself but to a variety of other surfaces, as will be described subsequently. When a group of resins was discovered that would adhere to polyester film (component "A"), it was found that the polyester film surface thus coated remained tacky or pressure-sensitive, and thus would "block" or stick to itself or other materials at normal room temperatures. This would of course make their use for most purposes quite impractical. After intensive investigation, the additional discovery was made that if the component "A" resin was formulated with one of the two types of resins herein described as component "B," a tough, non-blocking film could be formed on the polyester film, and that this film not only had remarkable adhesion to the polyester, but that the thus coated film could then be heat-sealed to itself or to a large variety of utterly different types of surfaces. It was further found that these formulations had excellent "machineability," that is, they could be applied to the polyester film by means of modern, high-speed coating machines, without difficulty. Furthermore, the coatings were characterized by notable water and heat resistance. Thus, for example, when "Mylar" was coated with the formulation of our invention and subsequently heat sealed to itself to form bags or packets, it was found that these bags could be subjected to boiling water or high steam pressure for substantial periods without loosening the adhesive bond. This is of the utmost importance where bags or packets are to be steam-sterilized, as is often required in the case of pharmaceutical and medicinal preparations.

While under some circumstances it might be possible to employ the "A" and "B" components in the form of their aqueous emulsions, we prefer to employ the resins dissolved in a mutual solvent. The particular solvent will of course depend upon the particular combination of resins being used, but in any case it should be sufficiently volatile so that after application of the coating a dry film will readily result. Thus, for most resin combinations methyl ethyl ketone has been found to be an excellent solvent. Isopropyl alcohol and toluene have also been successfully used.

It is also possible, though less preferable, to melt the two resin components together to a liquid form, which resolidifies upon cooling. The fabricator using such a "hot melt" heats the material to the fluid state and applies the hot fluid to the polyester film to form the coating. The previously mentioned solvent method, wherein the resins are applied in the form of a lacquer, does not require the application of heat.

The relative proportions of components "A" and "B" may vary over a wide range, depending upon the particular resins employed and the use to which the ultimate coating is to be put. Generally, we have found that excellent results are obtained when the "A" and "B" components are within the approximate ratios 1:8 to 1:2, but it will be seen that the practitioner will be best able to vary the proportions in the light of the particular circumstance. A particularly soft and tacky component "A" resin will ordinarily require the use of a larger proportion of the anti-blocking "B" component.

The amount of solvent used is not critical, since it is merely a medium for carrying the resins. It will depend upon the particular combination of resins, as well as upon the viscosity desired in the final lacquer.

Instead of using one component "A" and one component "B" resin, it is entirely feasible to use mixtures of one or more "A" resins with one or more "B" resins.

The following examples will further illustrate the embodiment of our invention, without limitation upon its scope:

Example I

In this as well as in the subsequent examples, all parts given are by weight.

Five parts of "Hycar 1312" and 20 parts of a vinyl acetate-chloride copolymer containing 91% chloride, 3% acetate and 6% hydroxyl groups calculated as polyvinyl alcohol were dissolved in 75 parts of methyl ethyl ketone, to form a clear lacquer.

A coating of the above material, having a thickness while wet of ½ mil, was cast upon "Mylar" in the conventional manner, and dried at 275° F. for one minute. Using a bar-type heat sealing machine (this particular machine being a flat bar heat sealer sold by Packaging Industries, Montclair, New Jersey, under the name "Sentinel Heat Sealer") we sealed a strip of the thus coated "Mylar" to another strip of similarly coated "Mylar." The bar of the heat sealing machine was heated to 375° F., and the "dwell time" (i. e., the period during which the heated bar was in contact with the Mylar) was ¼ second; the bar was in contact with the "Mylar" during this period at a pressure of 40 p. s. i. When the adhesive bond thus formed was tested on a tensile testing machine, such as that sold by W. C. Dillon & Co., Forest Park, Illinois, under the name "Dillon Multi-Low-Range Universal Tester, Model M," it was found that the bond had a strength equivalent to 1.0 to 1.7 lbs. per linear inch.

In order to indicate the comparative strengths of the adhesive bond on "Mylar" coated with our formulations as against those of standard heat seal coated cellophane, we conducted the following experiments. Using a standard heat seal coated cellophane, as sold by E. I. du Pont de Nemours & Co. under the trade name "450 MST," we heat sealed the film to itself, using the above-described Sentinel Heat Sealer. With a "dwell time" of ½ second and a pressure of 40 p. s. i., a heating temperature of 300° F. resulted in a tensile adhesive strength (when measured on the Dillon tester as described above) of zero. A heating temperature of 325° F., with the same dwell time and pressure, resulted in a tensile adhesive strength of 0.6 to 0.85 lb. per inch. Temperatures higher than 325° F. are not feasible for cellophane, since it would tend to shrink and become distorted. It will be seen from this and the subsequent examples that the coated polyester film of our invention results in adhesive bonds at least as strong and in most cases very much stronger than those obtainable with standard coated cellophane stocks, even when the polyester is subjected to half as long a dwell time.

*Example II*

6.8 parts of "Hycar 1312" and 18.2 parts of a vinyl acetate-chloride copolymer containing 91% chloride, 3% acetate and 6% hydroxyl groups calculated as polyvinyl alcohol were dissolved in 75 parts of a mixture of equal part of methyl ethyl ketone and toluene. This lacquer was coated upon a sheet of "Mylar" film, in the manner and thickness described in Example I, and dried. Using a bar-type heat sealer, as in the previous example, the thus coated "Mylar" was adhered to another strip of "Mylar" similarly coated, and when the adhesive bond thus formed was tested on a Dillon tensile tester, it was found that the adhesive strength was within the range 1.75 to 1.95 lbs. per linear inch.

*Example III*

Five parts of General Mill's "Polyamide 115" and 20 parts of a vinyl acetate-chloride copolymer containing 91% chloride, 3% acetate and 6% hydroxyl groups calculated as polyvinyl alcohol were dissolved in 75 parts of a mixture of equal parts of methyl ethyl ketone, toluene and isopropyl alcohol. When coated upon "Mylar," adhered and tested as in Example I, the adhesive strength was found to be within the range 1.4 to 1.75 lbs. per inch.

*Example IV*

6.8 parts of General Mill's "Polyamide 100" and 18.2 parts of a vinyl acetate-chloride copolymer containing 91% chloride, 3% acetate and 6% hydroxyl groups calculated as polyvinyl alcohol were dissolved in 75 parts of methyl ethyl ketone. When applied to "Mylar," dried, heat sealed and tested as in the previous examples, the adhesive tensile strength was found to be within the range 1.0 to 1.5 lbs. per inch.

*Example V*

Five parts of "Hycar 1042X17" and 20 parts of a vinyl acetate-chloride copolymer containing 91% chloride, 3% acetate and 6% hydroxyl groups calculated as polyvinyl alcohol were dissolved in 75 parts of a mixture of equal parts of methyl ethyl ketone and isopropyl alcohol. When applied to "Mylar," dried, heat sealed and tested as previously described, the adhesive tensile strength was within the range 2.0 to 2.9 lbs. per inch.

*Example VI*

8.3 parts of "Hycar 1042X17" and 16.7 parts of Dow's "Saran F120" were dissolved in 75 parts of methyl ethyl ketone. When the lacquer thus formed was coated upon "Mylar," dried, heat sealed and tested as described, the adhesive tensile strength was found to be within the range 2.4 to 3.0 lbs. per inch.

*Example VII*

Five parts of "Polyco 1665-24" and 20 parts of a vinyl acetate-chloride copolymer containing 91% chloride, 3% acetate and 6% hydroxyl groups calculated as polyvinyl alcohol were dissolved in a mixture of 50 parts of methyl ethyl ketone and 25 parts of toluene. The lacquer thus formed was coated upon "Mylar," dried, heat sealed and tested as previously described. The adhesive tensile strength was found to be within the range 1.5 to 2.0 lbs. per inch.

*Example VIII*

2.5 parts of "Polyco 1665-24" and 20 parts of Dow's "Saran F120" were dissolved in 75 parts of methyl ethyl ketone to form a clear lacquer. When coated upon "Mylar," dried, heat sealed and tested as indicated, the adhesive tensile strength was found to be within the range 1.5 to 2.0 lbs. per inch.

*Example IX*

Five parts of "Polyco 1665-24," 3 parts of "Polyamide 115" and 20 parts of "Saran F120" were dissolved in 70 parts of methyl ethyl ketone. When coated upon "Mylar," dried, heat sealed to a similarly coated sheet of "Mylar" and tested as previously indicated, the adhesive tensile strength was found to be approximately 1.3 lbs. per inch.

*Example X*

Five parts of polyvinyl methyl ether and 20 parts of a vinyl acetate-chloride copolymer containing 91% chloride, 3% acetate and 6% hydroxyl groups calculated as polyvinyl alcohol were dissolved in 75 parts of methyl ethyl ketone. When coated upon "Mylar," dried, heat sealed and tested as in the previous examples, the adhesive tensile strength was found to be approximately 1.0 lb. per inch.

*Example XI*

Five parts of "Acrylon EA-5" and 20 parts of Dow's "Saran Resin F120" were dissolved in 75 parts of methyl ethyl ketone. When coated upon "Mylar," dried, heat sealed and tested as in the previous examples, the adhesive tensile strength was found to average approximately 1.5 lbs. per inch.

*Example XII*

8.3 parts of "Hycar 1042X17" and 16.7 parts vinyl acetate-chloride copolymer containing 86% chloride, 13% acetate and 1% interpolymerized dibasic acid were dissolved in 75 parts of methyl ethyl ketone. When coated upon "Mylar," dried, heat sealed and tested as previously described, the adhesive tensile strength was found to average approximately 1.0 lb. per inch.

*Example XIII*

Ten parts of aqueous emulsion of polyvinyl methyl ether (containing 50% solids) were mixed with 80 parts of an aqueous emulsion of a vinyl acetate-chloride copolymer containing 91% chloride, 3% acetate and 6% hydroxyl groups calculated as polyvinyl alcohol (containing 25% solids). It will be noted that no organic solvent was used in this case since the water was the carrier for the emulsified resins. When the above described mixed emulsion was coated upon "Mylar," dried, heat sealed and tested in the manner described in Example I, it was found that the adhesive tensile strength averaged 1.0 lb. per inch.

As was indicated in Example I, all of the coatings shown in the above examples were cast upon "Mylar" using ½ mil wet film. This thickness was used in order to indicate the lightest coating weight that would be likely to be applied commercially. However, further tests based upon a heavier coating of our formulation (1½ mil) showed significant increases in ultimate adhesive bond strength. It is clear therefore that the particular coating thickness shown in these examples is in no way a limitation upon the scope of our invention.

We have found that the sealing temperature of approximately 375° F. indicated in the above examples is particularly desirable in many cases. This temperature is considerably higher than that ordinarily recommended for sealing "Mylar" coated with materials other than those of our invention. It is believed that the combination of high heat, in the order of 375° F., and the particular formulations herein described, results in an optimum adhesion effect upon "Mylar."

The application of our coating materials makes possible the efficient use of polyester films such as "Mylar" in making bags or in wrapping bulk goods or packages. Besides the obvious uses of such bags, "Mylar" bags adhered with our compositions permit steam sterilization of bags containing medicinals and pharmaceutical items, as well as the cooking of vegetables and other foods in their original "Mylar" containers. These operations ordinarily involve the adhesion of "Mylar" to itself. However, as previously indicated, "Mylar" coated with the material of our invention may also be adhered to countless other surfaces. Thus, it may be laminated to asbestos, paper, paperbard, chipboard, textiles, wood, mica, glass fiber, metal foil or to films or sheets of other plastic materials such as vinyls, rubber, "Saran" or polyethylene. Some of the items successfully manufactured by such types of adhesion include metallic yarns ("Mylar" coated to both sides of aluminum foil and slit to requisite widths), electrical items, convolute or spiral wound tubes ("Mylar" laminated to kraft paper), electrical tapes, packaging of frozen juices or vacuum packaging (where low temperature adhesion is necessary), chemically resistant aprons and clothing ("Mylar"-"nylon"), decorative upholstery and wall coverings ("Mylar" to vinyl film), furniture and wall panelling (reverse printed "Mylar" laminated to wood), lining steel drums, lamination to acoustical tile and many other items where the unique properties of polyester films are found to be of value. In many cases we have found that heat-seal adhesion between "Mylar" and other surfaces is improved if the other surface is first coated ("primed") with a thin film of a synthetis rubber latex or cement such as a Buna-N or "Hycar" type.

We claim:

1. A linear polymeric terephthalate ester film coated with a clear, flexible, dried, non-tacky and heat-seal coating comprising said terephthalate ester film base and an applied coating, said coating consisting essentially of a first resin selected from the class consisting of polyvinyl alkyl ethers, butadiene-acrylonitrile copolymers, copolymers of alkyl acrylates with acrylonitrile, and low molecular weight polyamide resins derived from the condensation of polymerized unsaturated fatty acids with aliphatic polyamines, admixed with a second resin selected from the class consisting of vinyl acetate-chloride copolymers and vinylidene chloride-acrylonitrile copolymers, the second resin being present to at least twice the amount of said first resin.

2. The coated polyester film of claim 1 in which the first and second resins are in the ratio proportions ranging from 1:8 to 1:2.

References Cited in the file of this patent

UNITED STATES PATENTS

| | | |
|---|---|---|
| 2,555,111 | Bradley | May 29, 1951 |
| 2,599,581 | Perkins et al. | June 10, 1952 |
| 2,673,826 | Ness | Mar. 30, 1954 |
| 2,728,703 | Kiernan et al. | Dec. 27, 1955 |
| 2,728,737 | Wittcoff | Dec. 27, 1955 |

FOREIGN PATENTS

| | | |
|---|---|---|
| 684,674 | Great Britain | Dec. 24, 1952 |

OTHER REFERENCES

Mitchell: "Textile Applications for 'Mylar' Polyester Film," papers of the American Association for Textile Technology, Inc., March 1954, page 84.